United States Patent
Gohil et al.

(10) Patent No.: US 10,223,158 B2
(45) Date of Patent: Mar. 5, 2019

(54) APPLICATION EXECUTION ENVIRONMENT

(71) Applicant: INTERNATIONAL BUSINESS MACHINES CORPORATION, Armonk, NY (US)

(72) Inventors: Pradeep Gohil, Hursley (GB); Stephen J. Hobson, Hursley (GB); Anthony P. Papageorgiou, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 89 days.

(21) Appl. No.: 15/378,327

(22) Filed: Dec. 14, 2016

(65) Prior Publication Data

US 2018/0165119 A1 Jun. 14, 2018

(51) Int. Cl.
*G06F 9/48* (2006.01)

(52) U.S. Cl.
CPC ...... *G06F 9/4843* (2013.01); *G06F 2209/482* (2013.01)

(58) Field of Classification Search
None
See application file for complete search history.

(56) References Cited

U.S. PATENT DOCUMENTS

| 7,130,912 | B2 | 10/2006 | Nishikado et al. |
| 7,653,905 | B1 | 1/2010 | Lingamneni |
| 7,720,990 | B2 | 5/2010 | Shen et al. |
| 9,189,355 | B1 * | 11/2015 | Moturu ............... G06F 11/301 |
| 9,219,724 | B1 | 12/2015 | Choudhary et al. |
| 2008/0256552 | A1 | 10/2008 | Purpura |
| 2015/0046511 | A1 | 2/2015 | Frerking |

OTHER PUBLICATIONS

IBM, "Web Services and CICS Applications," 2006 (no further date available), pp. 1-153.

* cited by examiner

*Primary Examiner* — Sisley N Kim
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

An application is executed within an application execution environment. One or more service requests made by the executing application are monitored, and a service requesting profile is created for the application. The service requesting profile defines one or more service requests made by the application. The created service requesting profile for the application is accessed. The service request(s) defined within the accessed service requesting profile are performed independently of the execution of the application. One or more responses are received from the service request(s), and the response(s) from the service request(s) are provided to the application in response to a request from the application to perform the service request.

12 Claims, 5 Drawing Sheets

APPLICATION EXECUTION ENVIRONMENT

BACKGROUND

Aspects of the present invention relate to executing an application within an application execution environment.

SUMMARY

Shortcomings of the prior art are overcome and additional advantages are provided through the provision of a computer-implemented method. The computer-implemented method includes, for instance, executing an application within an application execution environment; monitoring one or more service requests made by the application; creating a service requesting profile for the application, the service requesting profile defining the one or more service requests made by the application; accessing the service requesting profile for the application; performing a service request defined within the service requesting profile independently of execution of the application; receiving one or more responses from the one or more service requests; and providing the one or more responses from the one or more service requests to the application, based on a request from the application to perform the one or more service requests.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Embodiments of the present invention will now be described, by way of example only, with reference to the following drawings, in which.

DETAILED DESCRIPTION

Figure 1:
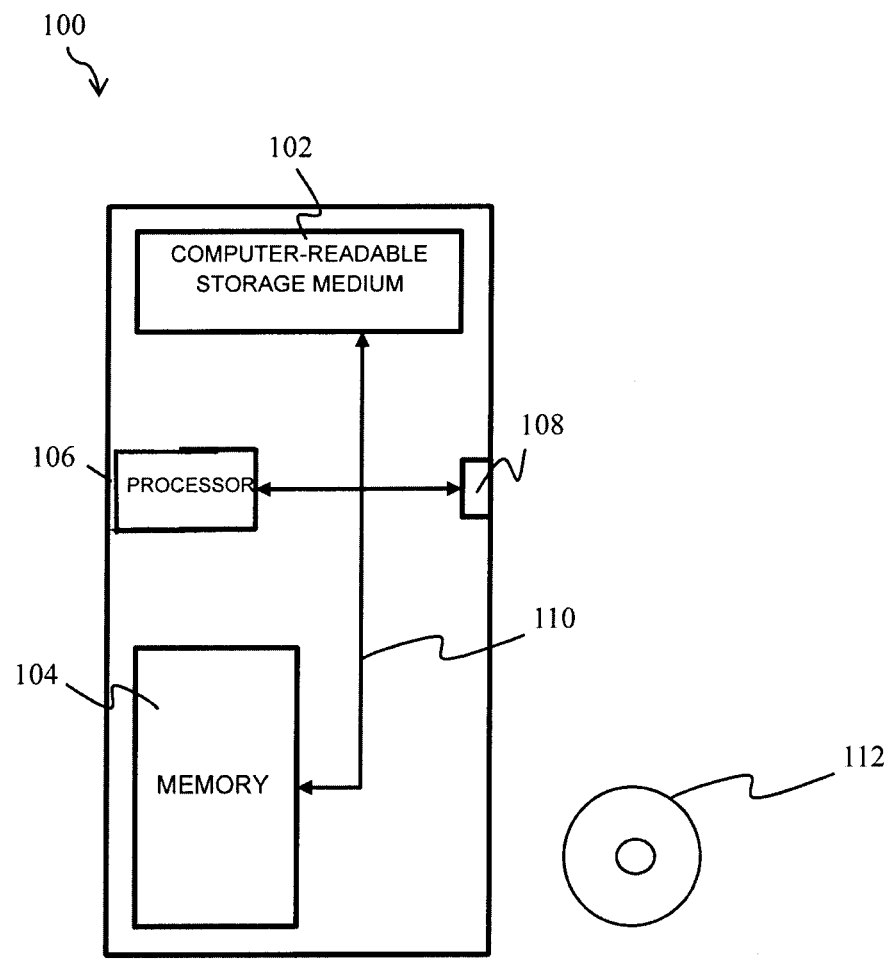
FIG. 1 is a schematic diagram of a computer system, in accordance with an aspect of the present invention.

FIG. 1 schematically illustrates one example of a computer system 100. The computer system 100 includes, for instance, a computer-readable storage medium 102, a memory 104, a processor 106 and one or more interfaces 108, which are all linked together over one or more communication buses 110. The computer system 100 may take the form of a conventional computer system, such as, for example, a desktop computer, a personal computer, a laptop, a tablet, a smart phone, a smart watch, a virtual reality headset, a server, a mainframe computer, and so on.

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs for execution by the processor 106. A computer readable medium 112 (here a CD-ROM 112) is also provided that can store a computer program product that comprises instructions for execution by the processor 106.

The processor 106 may be any data processing unit suitable for executing one or more computer readable program instructions, such as those belonging to computer programs stored in the computer-readable storage medium 102 and/or the memory 104. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network. The network may be any kind of network suitable for transmitting or communicating data from one computer system to another. For example, the network could comprise one or more of a local area network, a wide area network, a metropolitan area network, the internet, a wireless communications network, and so on. The computer system 100 may communicate with other computer systems over the network via any suitable communication mechanism/protocol. The processor 106 may communicate with the network interface via the one or more communication buses 110 to cause the network interface to send data and/or commands to another computer system over the network. Similarly, the one or more communication buses 110 enable the processor 106 to operate on data and/or commands received by the computer system 100 via the network interface from other computer systems over the network.

The interface 108 may alternatively or additionally comprise a user input interface and/or a user output interface. The user input interface may be arranged to receive input from a user, or operator, of the system 100. The user may provide this input via one or more user input devices (not shown), such as a mouse (or other pointing device), trackball or keyboard. The user output interface may be arranged to provide a graphical/visual output to a user or operator of the system 100 on a display (or monitor or screen) (not shown). The processor 106 may instruct the user output interface to form an image/video signal which causes the display to show a desired graphical output. The display may be touch-sensitive enabling the user to provide an input by touching or pressing the display.

It will be appreciated that the architecture of the computer system 100 illustrated in FIG. 1 and described above is merely an example and that systems having different architectures using alternative components or using more components (or fewer) may be used instead.

With the advent of Internet/web-based transaction processing, more enterprise users are moving towards implementation of a "service-oriented architecture" (SOA). Within a service-oriented architecture, applications provide services to other applications. That is to say, an application, typically referred to as a service consumer, may issue a service request (or query) to be processed by another application, typically referred to as an application service (or service provider). The application service may provide a response back to the application. The communications between applications and application services may take place over a network, such as the Internet. An application in a service-oriented architecture may make many requests during the course of its execution in order to obtain information from different application services. With each request for information to a service, the application typically waits for a response from that service before it continues. This can adversely affect the response time (or speed) with which an application is able to execute, which is often considered to be a key issue in application development.

It is common for applications within an SOA to rely on many different services offered by various service providers, including those that are both local to, or remote from, the location where the application is running. As an example, an application which results in a user being provided with a line of credit may make use of an external application service provided by a credit reference agency to carry out a credit check. The application may therefore issue a service request to the credit checking service containing particular information (such as name, address, date of birth and so on for an individual) and will then wait to receive a response from the credit checking service indicating the credit-worthiness of the individual. Once the response has been received, the application may decide whether or not to proceed with allowing the line of credit to be provided based on the response provided by the credit checking service. As another example, an application may, at some point during its processing, issue a request to an address application service in order to obtain a customer's address from a supplied house number and a postcode. In this example, the application may issue a request containing particular information (e.g., house number and postcode) and would receive a response back from the address application service with the full address details. In a typical application, some processing would be performed before the service request is issued (for example to obtain the house number and postcode or name, address and date of birth).

Application execution environments provide an environment in which applications may be executed. They typically provide a number of functions which support the execution of applications within the environment. Such functions include, for example, functions which allow control over the applications running in the environment, provide access to storage, facilitate inter-application communications within the environment or allow communications with external services outside of the environment. However, there are many other functions which may be provided by an application execution environment in order to support the execution of applications. Applications running within an application execution environment may make use of these functions provided by the application execution environment in order to carry out their tasks. At a general level, any operating system may be considered as providing an application execution environment. However, more specialized application execution environments exist which are designed to support rapid high-volume online transaction processing, such as Customer Information Control System, CICS® (CICS is a trademark of International Business Machines Corporation, registered in many jurisdictions worldwide). CICS is commonly used within a mainframe computing system environment to manage large-scale computer processing transactions for "enterprise" user organizations, such as banks, brokerage firms, insurance companies, large retailers, and so on. More specialized application execution environments, such as CICS, typically provide functionality which goes beyond (or augments) the functionality provided by an operating system. Such application execution environments may be provided as middleware running on top of an operating system.

Figure 2:
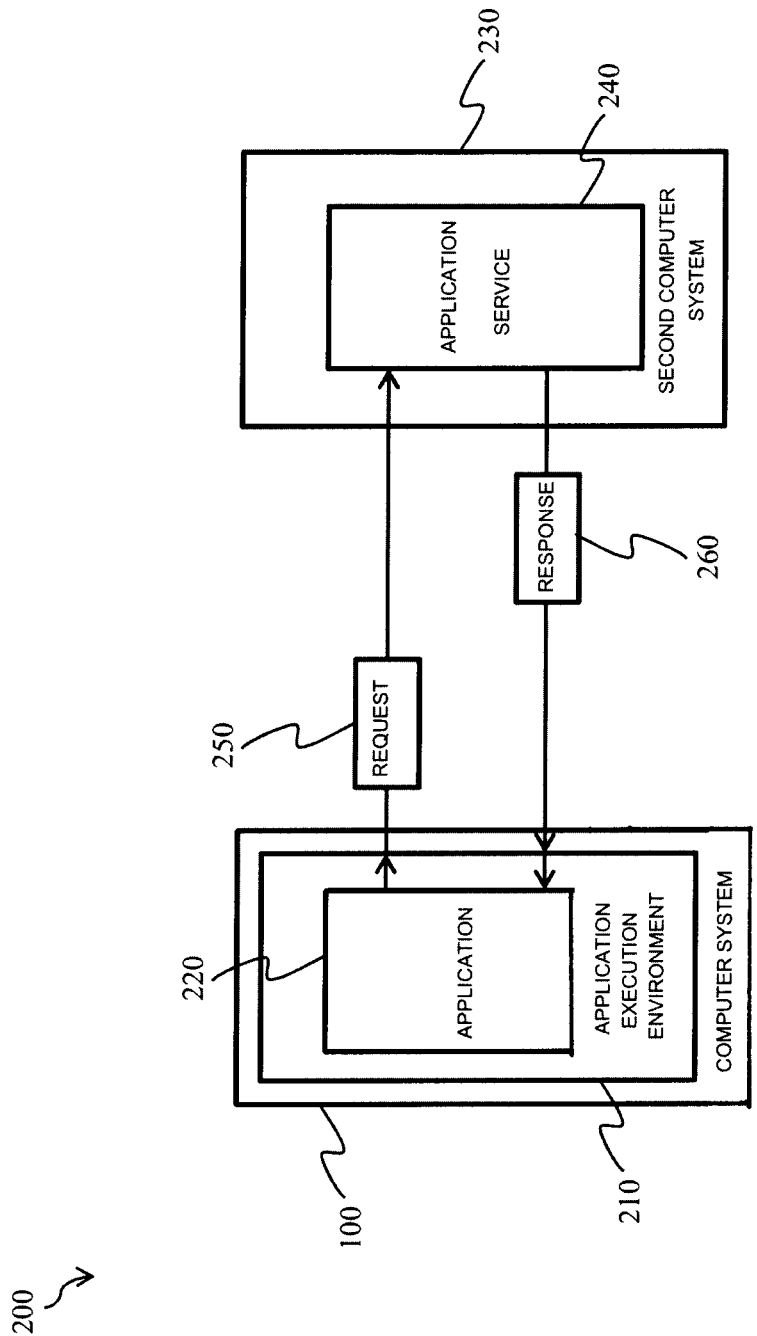
FIG. 2 is a schematic diagram of a system that includes the computer system of FIG. 1, in accordance with an aspect of the present invention.

FIG. 2 shows a system arrangement 200 illustrating the use of an application execution environment 210. The system 200 includes the computer system 100 of FIG. 1. In the system 200, the computer system 100 provides the application execution environment 210 within which an application 220 may be run. The system 200 also includes a second computer system 230 upon which an application service 240 is being run. The computer system 100 and the second computer system 230 can communicate via a network, such as the Internet.

The application 220 is enabled to send a service request (or query) 250 to the application service 240 over the network by the application execution environment 210. That is to say, the application 220 may issue the request 250 to the application execution environment 210 (or, alternatively, the application execution environment 210 may intercept the request 250 from the application 220) and the application execution environment 210 may then pass the request 250 on to the application service 240. The application service 240 may then process the request 250 and generate an appropriate response 260 which is transmitted back to the application 220 over the network via the application execution environment 210.

Figure 3:
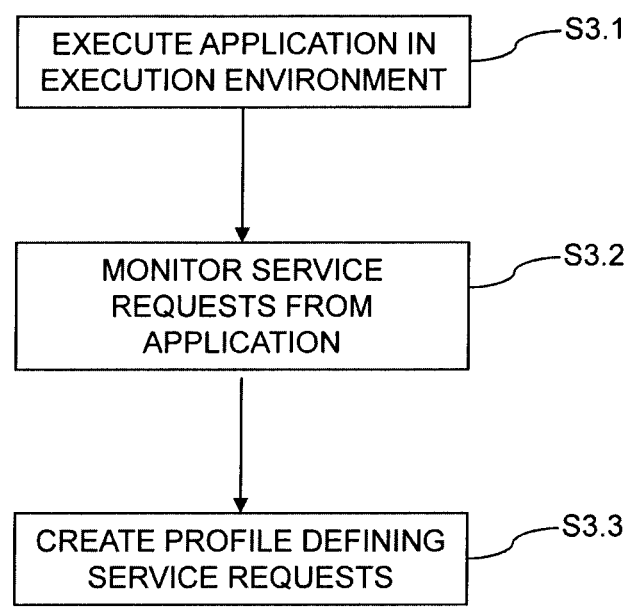
FIG. 3 is a flowchart of a method of operating an application execution environment, in accordance with an aspect of the present invention.

FIG. 3 shows one example of a flowchart of how the application execution environment 210 is operated, in relation to the application 220 transmitting service requests 250 to external application services 240 (of which there may be many different services 240 located on different computer systems 230). The first step of the method of FIG. 3 is step S3.1, which comprises executing the application 220 within the application execution environment 210 and the second step is step S3.2, which comprises monitoring one or more service request(s) 250 made by the executing application 220. The application execution environment 210 monitors the service requests 250 as they are made by the application 220 and creates a log of the service requests 250. The monitoring of the service requests 250 made by the application 220 may comprise monitoring all of the service requests 250 made by the application 220 or monitoring only specific identified service requests 250. In the latter case, a user or administrator may have identified specific individual requests 250 and/or general types of requests 250 to be monitored.

For a specific application 220, the log details each service request 250 made, the content of the service request 250, and where in the execution of the application 220 the service request is made. For example, assuming an application 220 with ten lines of code, the log details which line of code resulted in the service request 250 being made. From this log, at step S3.3, the application execution environment 210 creates a service requesting profile for the application 220, the service requesting profile defining one or more service request(s) 250 made by the application 220. The profile is generated after a specific number of service requests 250 have been made by an application 220. The generated profile can take the form of a hardened resource such as a readable file, but could also be configured as a set of rules stored in memory.

The generated profile defines one or more service requests 250 made by the application 220 and further comprises, for each defined service request 250 stored within the service requesting profile, the earliest point at which the service request 250 can be made in the execution of the application 220. The application execution environment 210, through the monitoring of one or more outgoing service requests 250, is able to create a profile that reflects the service requests 250 made by an application 220 during the normal operation of the application 220 in question. The profile defines the service requests 250 that are made by the application 220 when the particular application 220 executes.

The monitoring carried out by the application execution environment 210 can comprise accessing a list of predetermined named structures for the executing application 220 and detecting the execution by the application 220 of one of the named structures from the list of predetermined named structures. The application execution environment 210 can therefore effectively watch for specific predefined code terms being used by an application 220 and use the execution of these code terms as the basis for identifying the existence of external service requests within the structure of the application 220. The application execution environment 210 is then able to link the actual service requests 250 made by an application 220 to the code structure of that application 220.

Figure 4:
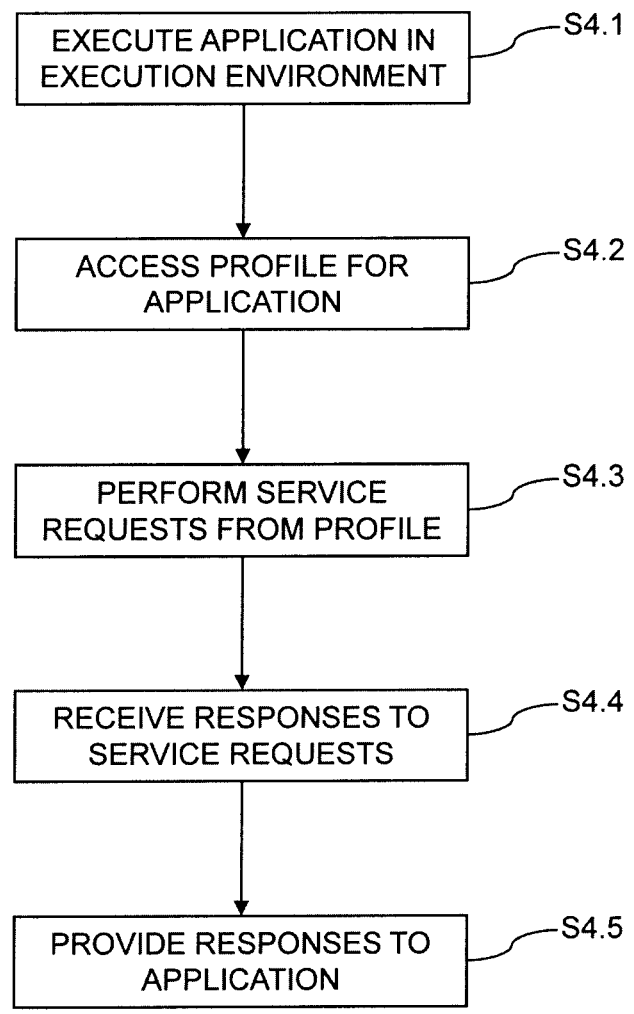
FIG. 4 is a further flowchart of a method of operating an application execution environment, in accordance with an aspect of the present invention.

FIG. 4 shows one example of a flowchart of a method of further operation of the application execution environment 210, once the profile has been created for the application 220. The first step of the method is step S4.1, which comprises executing the application 220 within the application execution environment 210 and the second step of the method is step S4.2, which comprises accessing the created service requesting profile for the application 220. The application execution environment 210 will now identify an execution of the application 220 and will access the profile for the application 220 in question. Each use of the application 220 will result in the profile being recalled from where it is stored in memory.

The next step in the method is step S4.3, which comprises performing the service request(s) 250 defined within the accessed service requesting profile from the application execution environment 210 independently of the execution of the application 220 and step S4.4 comprises receiving one or more responses 260 from the service request(s) 250. The application execution environment 210 will call the services that are detailed in the profile according to the service requests 250 that are defined in the profile. These service requests 250 are made by the application execution environment 210 independently of the application 220 and are not made as a result of actual service calls from the application 220.

The final step in the method is step S4.5, which comprises providing the response(s) 260 from the service request(s) 250 to the application 220 in response to a request from the application 220 to perform the service request 250. The application execution environment 210 holds the responses 260 to the requests 250 until the application 220 actually makes the appropriate service request 250 and the application execution environment 210 at that point will supply the response 260 to the application 220 immediately following the actual service request 250, thereby ensuring that there is no delay in the operation of the application 220. The responses 260 are available as soon as they are needed, as the application execution environment 210 has already executed the anticipated service requests 250.

The application execution environment 210 can be arranged to check that the request 250 from the application 220 to perform a service request 250 is identical to the performed service request 250 and only provide the response 260 from the service request 250 to the application 220, in response to the request 250 from the application 220 to perform the service request 250, only if the request 250 from the application 220 to perform a service request 250 is identical to the performed service request 250. Since the application execution environment 210 is anticipating the content of a service request 250 and obtaining a response 260 ahead of time, the application execution environment 210 checks that the service request 250 that is used is the same as the one that the application 220 does eventually generate.

Figure 5:
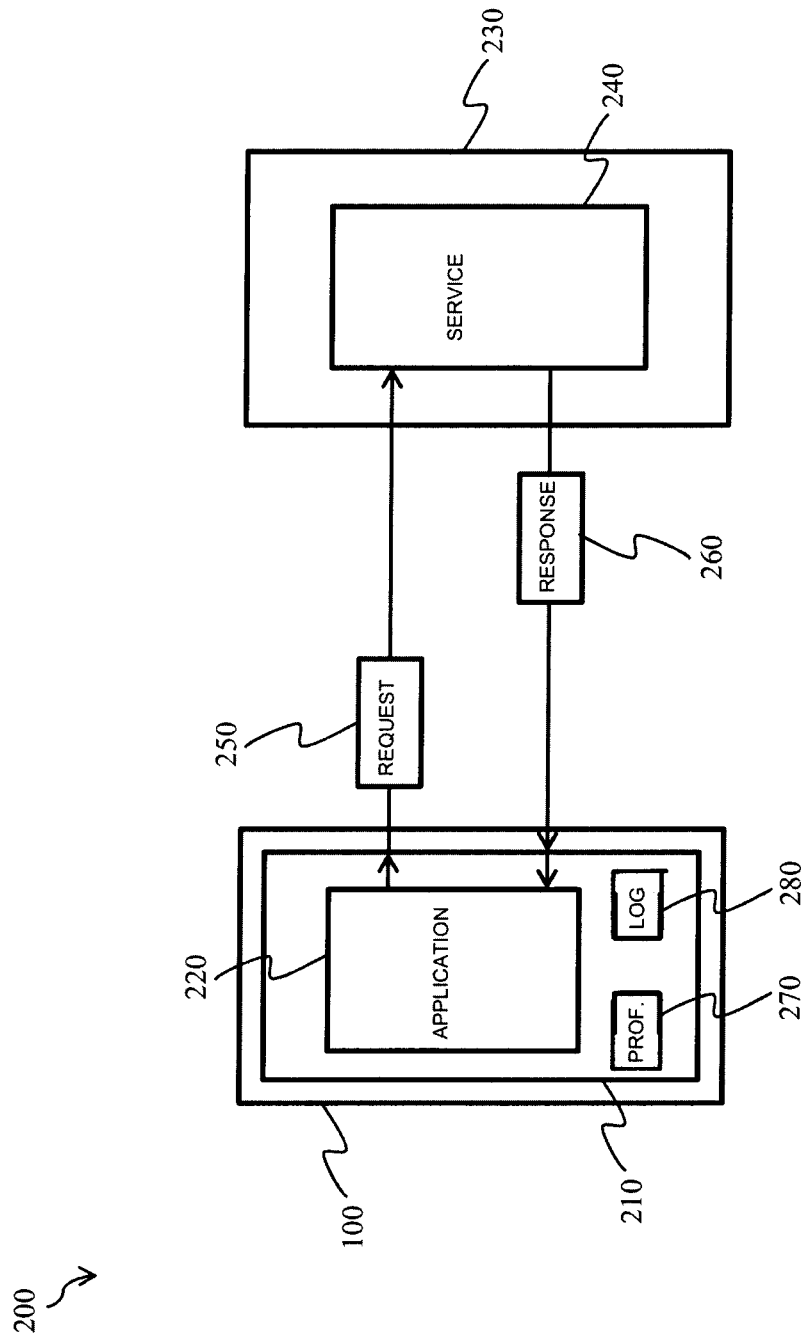
FIG. 5 is a schematic diagram of the application execution environment, in accordance with an aspect of the present invention.

FIG. 5 shows the application execution environment 210 as it is monitoring the application 220 during the creation of a profile 270, shown here as a readable file, but equally the profile 270 could be stored as a set of rules in memory. As described above, a log 280 is maintained as the application 220 is executed. This log 280 captures the service requests 250 that the application 220 is making to the external service 240 and details about how and when the service requests 250 are made. This information is used to create the profile 270. The application execution environment 210 continues to monitor one or more service request 250 made by the executing application 220 and updates the service requesting profile 270 for the application 220, the service requesting profile 270 still defining one or more service request(s) 250 made by the application 220.

The service requesting profile 270 defines one or more service request(s) 250 made by the application 220 and, e.g., also, further comprises, for each defined service request 250 stored within the service requesting profile 270, the earliest point at which the service request 250 can be made in the execution of the application 220. Based on the application execution environment's monitoring of the operation of the application 220, the profile 270 reflects the point at which the application execution environment 210 can make service requests 250 ahead of time. Some service requests 250 can be made as soon as the application 220 starts, but others may need to wait for certain preliminary actions to be taken by the application 220.

In general, the application 220 performs high through put, short lived tasks, which means that the application 220 does the same transactions repeatedly and in a similar way. By the application execution environment 210 observing that pattern of transactions and the external service calls 250 that are made, the application execution environment 210 can deduce and request services ahead of time, which will be required later on by the application 220. By the time the application 220 eventually requests the service 240, the results 260 may already be available, or if still in-flight, the waiting time to receive the results 260 will be reduced. This reduces the amount of time the application 220 spends waiting for services 240 to respond, and hence reduces the overall response time of the application 220. This solution does not require an application programmer to re-code the application 220, or to provide all of the information for the service call 250 up front. The application execution environment 210 is able to learn and autonomously pre-empt service request calls 250.

An example of an application execution environment 210 is CICS, which provides an environment in which applications 220 are run. CICS has a programming interface that provides opportunities for CICS to initiate its own logic during times of application execution. Such times include during program attach and initialization and during service requests such as PROGRAM LINK, INVOKE SERVICE, START etc. CICS also has named structures which are used for communication, such as DFHCOMMAREAs for program linkages and WS-DATA containers for web service requests. By monitoring the past executions of transactions, CICS can gain insight on service requests 250 and use this information to initiate these service requests 250, in parallel, ahead of time during future transactions.

The following (abbreviated) application 220 is used as an example of how an application execution environment 210, such as CICS, would interpret the external service requests 250 made by the application 220:
PROGA

| line | Instruction |
| --- | --- |
| 10 | Move 'foo' to QUOTE-BLOCK. |
| 20 | Move 'bar' to ADDRESS-BLOCK. |
| ... | |
| 30 | Move 'bar2' to ADDRESS-BLOCK. |
| ... | |
| 40 | EXEC CICS put container (WS-DATA) from (QUOTE-BLOCK) channel (quote-channel) |
| ... | |
| 50 | EXEC CICS invoke service (QUOTE-SERVICE) |
| 60 | EXEC CICS put container (WS-DATA) from (ADDRESS-BLOCK) channel (address-channel) |
| ... | |
| 70 | EXEC CICS invoke service (ADDRESS-SERVICE) |
| ... | |

In the example application 220, the . . . denote that the application 220 is executing other instructions during these times. When PROGA is invoked the first time in CICS, a service requesting profile 270 can be constructed as follows:

At line 40 "WS-DATA is destined for a web service. Log that QUOTE-BLOCK is important."

At line 50 "Associate QUOTE-BLOCK with service QUOTE-SERVICE."

At line 60 "WS-DATA is destined for a web service. Log that ADDRESS-BLOCK is important."

At line 70 "Associate ADDRESS-BLOCK with service ADDRESS-SERVICE."

This profile 270 currently results is no response time saving for the application 220. On a subsequent PROGA invocation in CICS, the service requesting profile 270 however can be augmented, for example as follows:

At line 40 "Writing QUOTE-BLOCK to WS-DATA. This is for service QUOTE-SERVICE. No other input is waiting for QUOTE-SERVICE. Call QUOTE-SERVICE now".

At line 60 "Writing ADDRESS-BLOCK to WS-DATA. This is for service ADDRESS-SERVICE. No other input is waiting for ADDRESS-SERVICE. Call ADDRESS-SERVICE now".

This level of insight will produce a minimal service waiting time improvement. For example, CICS can initiate the QUOTE-SERVICE request when receiving line 40, instead of waiting till line 50 which could be a few instructions later. After multiple PROGA invocations on CICS and by building up a more complete service requesting profile 270, greater saving can be achieved. For example, a profile 270 with a more complete set of instructions might comprise:

At line 10 "Writing data to QUOTE-BLOCK. QUOTE-BLOCK is never updated after this point. This is the only input for the QUOTE-SERVICE request. Call QUOTE-SERVICE now".

At line 20 "Writing data to ADDRESS-BLOCK. ADDRESS-BLOCK is updated later in the code so perform nothing pre-emptive at this point."

At line 30 "Writing data to ADDRESS-BLOCK. This is the last update of ADDRESS-BLOCK before the service is called. Call ADDRESS-SERVICE now".

At this point CICS has started to achieve near-maximum in-wait time savings. For example, The QUOTE-SERVICE request is being initiated after line 10, rather than at line 40. Depending on the amount of work executed between these instructions it is possible for the service 240 to have replied before the application 220 originally requests the service 240. This would eliminate the waiting time for the service 240. This has also been achieved in an automated way requiring no source code updates. The application execution environment 210 is able to create a profile 270 from the service requests 250 of the application 220 and use the profile 270 in future to save time by calling external services 240 ahead of time.

The application execution environment 210 can deduce which service 240 to call ahead of time. It is possible that the application 220 changes the service request 250 after the request 250 has been pre-empted, before the service request 250 was originally expected to be called. This could be due to a rare code path or other variation. It is therefore possible for the application execution environment 210 to cache the service invocation parameters for the pre-empted request 250. This can be compared against the actual service request 250. If this is the same then the results from the pre-empted request 250 would be used, else the service 240 would be re-requested.

It is possible in some systems that there are some services 240 which may not be suitable for pre-empting. An example could be an account withdrawal service. There can be enhancements to the application execution environment 210 to apply only to GET style services, or for users to indicate viability of particular services 240. For example, in CICS, a web service 240 could have a new attribute to indicate the service 240 is suitable for server optimized early calling. This would be a minimal impact to the developer/system programmer and would still require no code changes. This would ensure that the application execution environment 210 only uses the pre-empting on an external service 240 when it is safe to do so.

As described herein, according to one aspect of the present invention, there is provided a computer-implemented method comprising executing an application within an application execution environment, monitoring one or more service request(s) made by the executing application, creating a service requesting profile for the application, the service requesting profile defining one or more service request(s) made by the application, accessing the created service requesting profile for the application, performing the service request(s) defined within the accessed service requesting profile from the application execution environment independently of the execution of the application, receiving one or more responses from the service request(s), and providing the response(s) from the service request(s) to the application in response to a request from the application to perform the service request.

According to another aspect of the present invention, there is provided a system comprising a processor arranged to execute an application within an application execution environment, monitor one or more service request(s) made by the executing application, create a service requesting profile for the application, the service requesting profile defining one or more service request(s) made by the application, access the created service requesting profile for the application, perform the service request(s) defined within the accessed service requesting profile from the application execution environment independently of the execution of the application, receive one or more responses from the service request(s), and provide the response(s) from the service request(s) to the application in response to a request from the application to perform the service request.

According to a further aspect of the present invention, there is provided a computer program product for controlling a system, the computer program product comprising a computer readable storage medium having program instructions embodied therewith, the program instructions executable by a processor to cause the processor to execute an application within an application execution environment, monitor one or more service request(s) made by the executing application, create a service requesting profile for the application, the service requesting profile defining one or more service request(s) made by the application, access the created service requesting profile for the application, perform the service request(s) defined within the accessed service requesting profile from the application execution environment independently of the execution of the application, receive one or more responses from the service request(s), and provide the response(s) from the service request(s) to the application in response to a request from the application to perform the service request.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   executing an application within an application execution environment;
   monitoring one or more service requests made by the application;
   creating a service requesting profile for the application, the service requesting profile defining the one or more service requests made by the application;
   accessing the service requesting profile for the application;
   performing the one or more service requests defined within the service requesting profile independently of execution of the application;
   receiving one or more responses from the one or more service requests;
   providing the one or more responses from the one or more service requests to the application, based on a request from the application to perform the one or more service requests;
   wherein the creating the service requesting profile for the application further comprises, for each service request stored within the service requesting profile, storing within the service requesting profile an earliest point at which the each service request can be made in execution of the application; and
   deducing by the application executing environment, based on a pattern of the one or more service requests by the application and external service calls that are made, a next service request and sending the next service request for the application prior to the earliest point.

2. The computer-implemented method according to claim 1, further comprising checking that the request from the application to perform a service request is identical to the service request that is performed, and providing a response from the service request to the application, based on the request from the application to perform the service request being identical to the service request that is performed.

3. The computer-implemented method according to claim 1, further comprising continually monitoring service requests made by the application and updating the service requesting profile for the application.

4. The computer-implemented method according to claim 1, wherein the monitoring the one or more service requests made by the application comprises:
   accessing a list of predetermined named structures for the application; and
   detecting execution by the application of one named structure from the list of predetermined named structures.

5. A computer system comprising:
   a memory; and
   a processor in communication with the memory, wherein the computer system is configured to perform a method, said method comprising:
   executing an application within an application execution environment;
   monitoring one or more service requests made by the application;
   creating a service requesting profile for the application, the service requesting profile defining the one or more service requests made by the application;
   accessing the service requesting profile for the application;
   performing the one or more service requests defined within the service requesting profile independently of execution of the application;
   receiving one or more responses from the one or more service requests;
   providing the one or more responses from the one or more service requests to the application, based on a request from the application to perform the one or more service requests;
   wherein the creating the service requesting profile for the application further comprises, for each service request stored within the service requesting profile, storing within the service requesting profile an earliest point at which the each service request can be made in execution of the application; and
   deducing by the application executing environment, based on a pattern of the one or more service requests by the application and external service calls that are made, a next service request and sending the next service request for the application prior to the earliest point.

6. The computer system according to claim 5, wherein the method further comprises checking that the request from the application to perform a service request is identical to the service request that is performed, and providing a response from the service request to the application, based on the request from the application to perform the service request being identical to the service request that is performed.

7. The computer system according to claim 5, wherein the method further comprises continually monitoring service requests made by the application and updating the service requesting profile for the application.

8. The computer system according to claim 5, wherein the monitoring the one or more service requests made by the application comprises:
   accessing a list of predetermined named structures for the application; and
   detecting execution by the application of one named structure from the list of predetermined named structures.

9. A computer program product comprising:
   a computer readable storage medium readable by a processing circuit and storing instructions for execution by the processing circuit for performing a method comprising:

executing an application within an application execution environment;

monitoring one or more service requests made by the application;

creating a service requesting profile for the application, the service requesting profile defining the one or more service requests made by the application;

accessing the service requesting profile for the application;

performing the one or more service requests defined within the service requesting profile independently of execution of the application;

receiving one or more responses from the one or more service requests;

providing the one or more responses from the one or more service requests to the application, based on a request from the application to perform the one or more service requests;

wherein the creating the service requesting profile for the application further comprises, for each service request stored within the service requesting profile, storing within the service requesting profile an earliest point at which the each service request can be made in execution of the application; and deducing by the application executing environment, based on a pattern of the one or more service requests by the application and external service calls that are made, a next service request and sending the next service request for the application prior to the earliest point.

10. The computer program product according to claim 9, wherein the method further comprises checking that the request from the application to perform a service request is identical to the service request that is performed, and providing a response from the service request to the application, based on the request from the application to perform the service request being identical to the service request that is performed.

11. The computer program product according to claim 9, wherein the method further comprises continually monitoring service requests made by the application and updating the service requesting profile for the application.

12. The computer program product according to claim 9, wherein the monitoring the one or more service requests made by the application comprises:

accessing a list of predetermined named structures for the application; and detecting execution by the application of one named structure from the list of predetermined named structures.

\* \* \* \* \*